US006342175B1

United States Patent
Brown et al.

(10) Patent No.: US 6,342,175 B1
(45) Date of Patent: Jan. 29, 2002

(54) METHOD OF CARVING SHAPES IN A PUMPKIN SHELL

(75) Inventors: Barry P. Brown; Cheryl A. Stoughton, both of Denver; Sandra B. DeVore, Lakewood; Michael D. Hennessey, Denver, all of CO (US)

(73) Assignee: Pumpkin, Ltd,, Denver, CO (US)

( * ) Notice: Subject to any disclaimer, the term of this patent is extended or adjusted under 35 U.S.C. 154(b) by 0 days.

(21) Appl. No.: 09/348,850

(22) Filed: Jul. 7, 1999

(51) Int. Cl.[7] ............................ B26D 3/00; B26F 1/46
(52) U.S. Cl. ..................................... 264/155; 264/156
(58) Field of Search .................................. 264/155, 156

(56) References Cited

U.S. PATENT DOCUMENTS 4,296,659 A    10/1981   Nauman
4,689,885 A    9/1987    Albanese
4,828,114 A    5/1989    Bardeen
5,092,050 A    3/1992    Bardeen
5,933,968 A    8/1999    Solomon Primary Examiner—Leo B. Tentoni
(74) Attorney, Agent, or Firm—John R. Ley

(57) ABSTRACT

A pumpkin carving kit includes a cutting die having a closed peripheral configuration defining a shape to be carved into the pumpkin shell, a striking tool for driving the die into the pumpkin shell, and a scoop and scraping tool. The die has a lower cutting edge and an upper driving edge, and a striking surface of the striking tool has a lateral dimension which is greater than the majority of the largest transverse dimension of the striking edge to uniformly distribute impact force to the die. Serrations of the cutting edge of the die are forced into the pumpkin shell to hold the die in position before it is struck. The scoop and scraping tool is used to scrape the thickness of the pumpkin wall so that the die will extend through it.

30 Claims, 7 Drawing Sheets

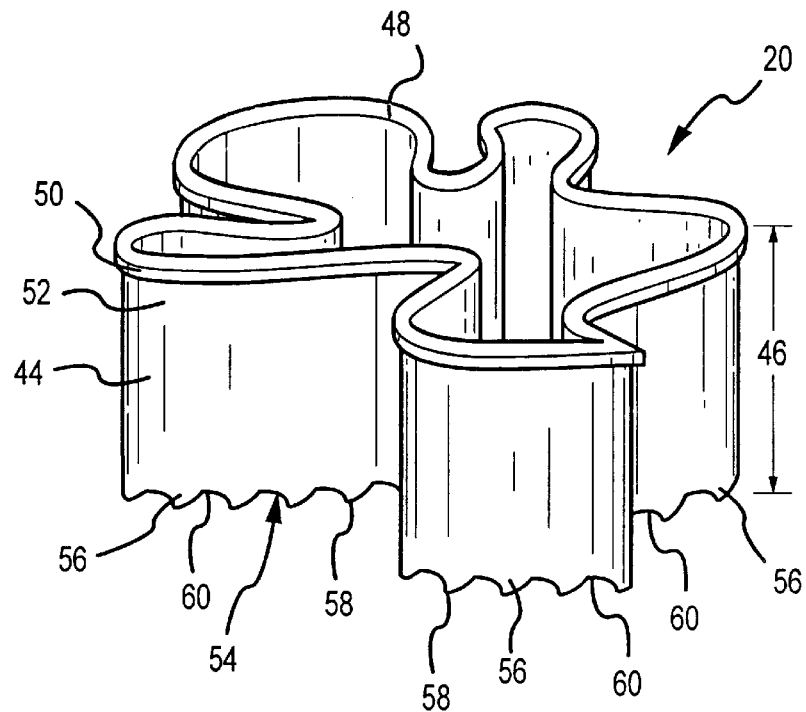
FIG.2
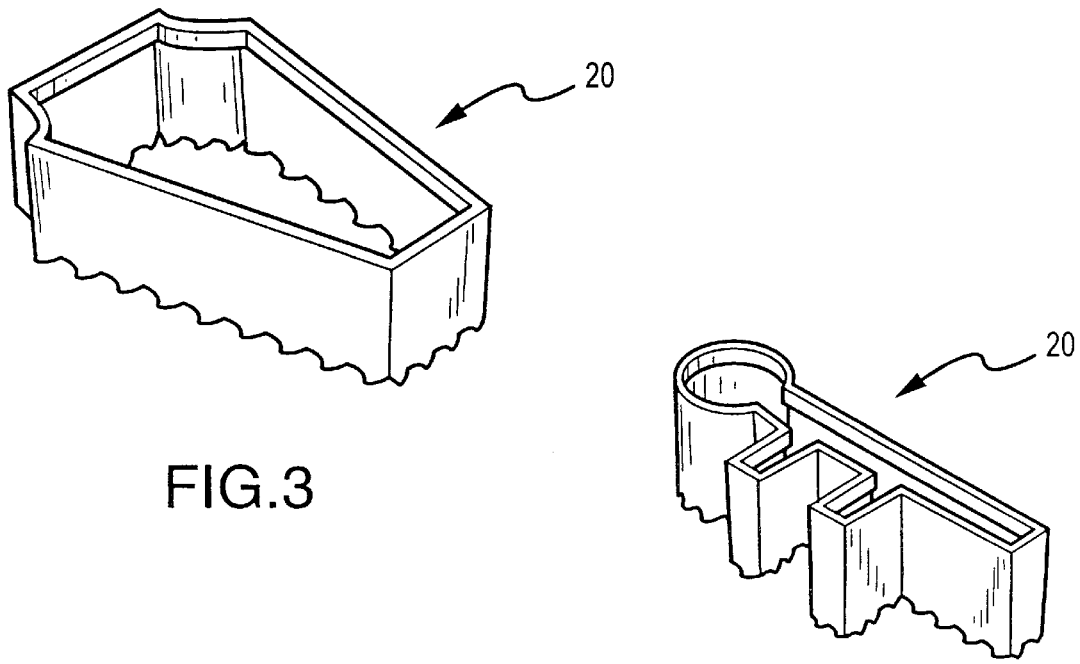
FIG.3
FIG.4

METHOD OF CARVING SHAPES IN A PUMPKIN SHELL

FIELD OF THE INVENTION

This invention relates to the activity of pumpkin carving, as occurs in the United States at Halloween when jack-o'-lanterns are created from pumpkins. More particularly, the present invention relates to a new and improved method, apparatus, and kit involving the use of a cutting die, a striking tool, and a scoop and scraping tool for creating cut-out designs in the shell of a pumpkin.

BACKGROUND OF THE INVENTION

Pumpkin carving is usually associated with the holiday of Halloween. Scary, unusual or artistic faces or designs are carved into and through the shell of a pumpkin. The carved pumpkin is then placed in a prominent location and a candle or other light source is placed inside of the pumpkin so that the carved design may be highlighted and seen and enjoyed at night.

The traditional method of carving a pumpkin involves cutting a hole or lid in the top of the pumpkin with a knife or tool. The lid is then removed and the pumpkin seeds and fiber material within the hollow interior are removed, either by hand or with a spoon. A face or design is then carved into the shell of the pumpkin using a knife, saw or other tool.

There are a number of difficulties associated with this traditional method of pumpkin carving. The shell of the pumpkin may be thick and tough, making it difficult to carve. Some people, especially children, do not have the strength or manual dexterity required to manipulate the cutting tool into and through the shell. The force required may be so great that control over the cutting tool will be momentarily lost, resulting in a cracked pumpkin shell or an inadvertent cut in the shell at an undesired location. It is also difficult to remove the pumpkin seeds and fiber material within the interior of the pumpkin. Finally, it is sometimes difficult to think of and cut new or interesting designs into the pumpkin shell.

One alternative to the traditional method of pumpkin carving involves the use of cookie cutter-like cutting dies to form the cut-out shapes, as described in U.S. Pat. No. 4,296,659. The dies may take a variety of different shapes such as the traditional jack-o'-lantern eyes, nose, and mouth. The dies typically have a side wall with a cutting edge and a striking edge. Impact force is applied to the striking edge to drive the cutting edge into and through the shell. The die is held with one hand in position on the pumpkin shell with the cutting edge touching the shell. The other hand wields a hammer or other impact-inducing device to strike the striking edge. After the die is started into the shell, continued impacts drive the die into the pumpkin shell until the die cuts through the shell and creates a hole in the shell in the shape of the die.

Striking the die in the manner required can be awkward and difficult. Many people have difficulty in coordinating the hammer movement with the position of the die and the location of the striking edge. The hammer may miss the die completely, or impact the die with a deflecting blow and crack or damage the shell of the pumpkin. Damaging the shell of the pumpkin becomes more likely as the die is driven deeper into the shell. If the die is not driven uniformly into the shell of the pumpkin, the die may become canted or misaligned, making the penetration more difficult, damaging the shape formed, or increasing the risk of cracking the shell.

A block of wood may be placed over the striking edge to distribute the force from the hammer evenly over the striking edge of the die, as well as to provide a larger striking surface. Use of a force-distributing wood block requires the die and wood block to be held in one hand while the other hand manipulates the hammer. Holding the three tools (die, wood block and hammer) with two hands increases the amount of physical coordination required to the point of being difficult or impossible. It is virtually impossible to hold the die in the desired initial position so the first blows can be struck if the wood block is also employed. If the wood block is not employed to start the penetration of the die, the uneven force distribution from impacts at localized positions along the striking edge may start the die into the shell unevenly, thereby causing canting, misalignment and damage to the shell, even if the wood block is later used to distribute the impact force over the entire striking edge. Once the die has been started into the shell, there is no longer any need to hold it in position, but the wood block and the hammer must still be held.

Another previously known method of carving a pumpkin involves using a hollow die element with an open end that has a sharp cutting edge and a handle at an opposite end. A person grips the handle and pushes the sharp open end into the shell of the pumpkin. The handle is then used to pull the die from the pumpkin leaving a hole in the shell the shape of the die element. The cut-out pumpkin piece remains in the die and is removed by pushing the piece out from an access slot formed in the die. While this technique avoids some of the problems associated with coordinating and striking the die element, it increases the cost of the die and the amount of physical coordination and strength required to use the die. Since the die is forced through the pumpkin shell by manual force, rather than impacts, considerable strength may be required to push the die through the shell.

It is in response to this and other background information, as well as the desire to simplify and to make more enjoyable the activity of carving pumpkins into jack-o'-lanterns, that the present invention has emerged.

SUMMARY OF THE INVENTION

One aspect of the present invention relates to an inexpensive, pumpkin-carving cutting die element. The cutting die has one continuous wall which forms the outline of the shape which is to be cut into the pumpkin. The cutting die may assume many different shapes, but preferably the shapes are in some way related to the holiday of Halloween since the invention will be used primarily during that holiday. The upper portion of a wall of the die has a striking edge which protects the die from deformation due to striking and promotes its uniform penetration into the pumpkin shell. The lower portion of the wall has a number of serrations which allow the die to be relatively easily and manually pressed into and affixed in an initial position on the pumpkin shell without impacting the die. The serrations are preferably dull to avoid injury to the user but have a curvature which promotes manual penetration. Once manually affixed to the shell in the initial position, the die can be safely and easily driven into the pumpkin with a striking tool.

A further aspect of the present invention relates to a simplified method of cutting or carving designs in the shell of a pumpkin. The steps of the method include placing the serrated edge of a cutting die in contact with the outer surface of the pumpkin shell, forcing the die against the pumpkin shell to pierce the shell of the pumpkin with at least some of the serrations to hold the cutting die in place on the pumpkin shell, driving the cutting die into the pumpkin shell with impacts from a striking tool whose striking surface is generally larger than the majority of any lateral dimension of the cutting die, and removing the die and the cut-out portion of the pumpkin shell from the pumpkin. Other preferable steps of the method include scooping the contents from the interior of the pumpkin with a scoop and scraping tool, and scraping the interior wall of the pumpkin shell with the tool to reduce the wall thickness of the pumpkin shell to a thickness which is less than the height of the wall of the cutting die. Scraping the interior wall of the pumpkin to reduce the shell thickness assures that the cutting die will penetrate the shell. Reducing the thickness of the shell also reduces the risk of inadvertent damage to the shell which may occur from attempting to drive the cutting die through a shell which is too thick for the cutting die.

An additional aspect of the present invention relates to a pumpkin carving kit which includes all of the tools necessary to quickly and safely carve interesting designs in the shell of a pumpkin, in one convenient assembly. The kit contains one or more pumpkin cutting dies of the type discussed above, a striking tool, and a combination scoop and scraping tool.

The combination scoop and scraping tool of the kit comprises a handle and a scoop, both of which are of a size and configuration that may be handled and manipulated within the pumpkin shell relatively easily. The scoop also includes an integrated cutting edge which extends along an outer edge of the scoop. The scoop portion of the scoop and scraping tool easily removes the seeds from the interior of the pumpkin, and its cutting edge is used to scrape the inner walls of the pumpkin to a desired thickness to accommodate the best use of the die.

The striking tool included in the kit comprises a handle portion and a head portion. The head portion has a striking surface which is sized to contact the majority of any lateral dimension of the striking edge of the cutting die and preferably the entire upper striking edge of the cutting die. When the striking surface of the head portion comes in contact with the striking edge of the cutting die, an even distribution of force is applied to the cutting die, thus producing a more uniform cut and driving the cutting die into the pumpkin shell directly and uniformly without tilting and canting. The relatively large shape of the head portion also reduces the risk that a missed impact will occur causing damage to the pumpkin shell, such as may occur when a conventional hammer is used. The relatively large size of the head portion also facilitates contact with the cutting die.

A more complete appreciation of the present invention and its scope can be obtained by reference to the following detailed description of presently preferred embodiments of the invention taken in connection with the accompanying drawings, which are briefly summarized below, and by reference to the appended claims.

BRIEF DESCRIPTION OF THE DRAWINGS

FIG. 2 is an enlarged perspective view of an exemplary pumpkin cutting die element of the type shown in FIG. 1.

FIGS. 3 and 4 are perspective views of other pumpkin cutting die elements similar in structure but different in shape compared to the cutting die element shown in FIG. 2.

DETAILED DESCRIPTION

Figure 1:
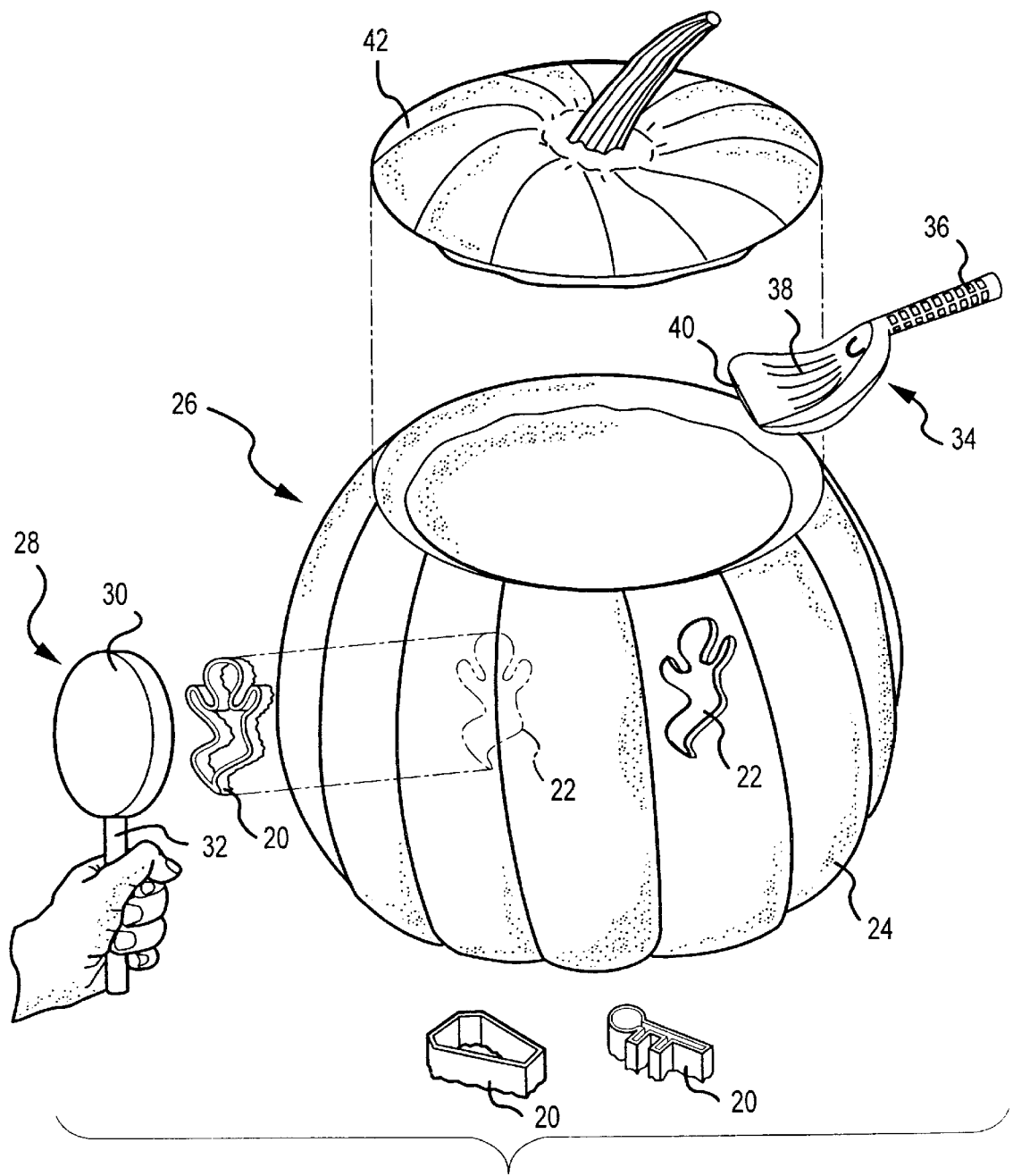
FIG. 1 is a perspective illustration of a pumpkin being carved into a jack-o'-lantern by use a cutting die, a striking tool, and a combination scoop and scraping tool, all in accordance with method, kit and apparatus aspects of the present invention.

An exemplary pumpkin cutting die element 20 which is used to carve a shape 22 into and through the shell 24 of a pumpkin 26, is shown in FIG. 1. The cutting die 20 may be constructed in one of many different configurations, but the configuration of the cutting die determines the shape 22 formed in the pumpkin shell 24. A striking tool 28 is used to drive the pumpkin cutting die 20 into the shell 24 of the pumpkin 26, thus creating the shape 22. The striking tool 28 includes a head 30 from which a handle 32 extends. The user grips the handle 32 and swings the head 30 into contact with the cutting die 20, thus driving the cutting die 20 into the pumpkin shell 24 by applying repeated impacts to the die 20.

A combination scoop and scraping tool 34 is also used with the die 20 and the striking tool 28. The scoop and scraping tool 34 is preferably of the type described in U.S. Pat. No. 5,092,050 to Bardeen. The scoop and scraping tool 34 has a handle portion 36, a scoop portion 38 connected to the handle portion 36, and a cutting edge 40 extending along edges of the scoop portion 38 on the opposite side of the handle portion 36. After a lid 42 or other access opening has been cut into the shell 24 of the pumpkin 26, the user grips the handle portion 36 of the scoop and scraping tool 34 and inserts it through the access opening made by removing the lid 42 and into the interior of the pumpkin 26. The cutting edge 40 is used to scrape and dislodge the interior fibers and seeds from the shell 24 and the scoop portion 38 is used to collect, contain and lift them from the interior of the pumpkin. Once the interior of the pumpkin 26 is free of the interior fibers and seeds, the cutting edge 40 is used to scrape the inner surface of the shell 24 until the shell is of a thickness which will allow the die 20 to completely cut through the shell 24 and create the shape 22. Preferably the thickness of the wall after scraping will be about 1.5 inches or less.

A plurality of cutting dies 20 are preferably supplied in a pumpkin carving kit. The kit also includes the striking tool 28 and the scoop and scraping tool 34. Each cutting die 20 of the kit preferably has a different configuration, and that configuration is preferably related to an image or symbol associated with the holiday of Halloween, since the present invention will be used primarily during this holiday. Dies of other configurations may also be provided. Examples of dies 20 having different configurations are shown in FIGS. 2–4. The die 20 shown in FIG. 2 has the configuration of a ghost or spook. The configuration of the die 20 shown in FIG. 3 is of a tombstone. The die 20 shown in FIG. 4 has the configuration of a fence post.

Different dies may be used in combination to create combined shapes 22. Each combined shape will be different than the singular configuration of each cutting die, because of the juxtaposition of the shapes made by the combination of the different dies 20. For example, multiple alternating inverted and upright vertically oriented fence post shapes (FIG. 4) may be formed in a horizontal sequence, and this sequence will resemble a fence. Any number of other types of singular or combination shapes can be created. Each die should define a continuous peripheral configuration so that the cut-out section of the pumpkin shell 24 circumscribed by the die 20 can be removed from the pumpkin shell and from within the interior of the die, after the die has been forced through the pumpkin shell.

As represented by the cutting die 20 shown in FIG. 2, each cutting die has a continuous side wall 44 of predetermined height 46. The side wall 44 includes an upper striking edge 48 formed in part by an upper lip 50 or reinforcement which extends completely around the upper striking edge 48. The striking edge 48 is preferably located in a plane at all locations on the die 20. The lip 50 is preferably formed by rolling or folding the upper edge 48 over onto an exterior surface 52 of the sidewall 44. The lip 50 increases the strength of the sidewall 44 and assists in distributing the impact load or stress from the upper striking edge 48 over the cutting die 20 when it is struck by the striking tool 28. Folding the lip 50 over on the exterior surface 52 of the side wall 44 also serves as a limit indication by which to drive the die 20 into the shell. The lip 50 also functions as a finger grip to facilitate removal of the cutting die 20 from the pumpkin shell 24 after it is driven into the shell.

A lower cutting edge 54 is formed on the side wall 44 of each cutting die 20. Serrations 56 are formed continuously along the lower cutting edge 54. Tips 58 of the serrations 56 form penetrating points which permit the cutting die 20 to be initially retained or tacked in the desired position on the pumpkin shell with the application of finger pressure on the die 20, freeing the user of the requirement to hold the die in place when it is first impacted and allowing more accurate placement of the die. The tips 58 of the serrations 56, in conjunction with recesses 60 formed between the tips 58, also create a more efficient shearing or cutting action in the pumpkin shell 24. The serrations 56 reduce the amount of force required to penetrate the pumpkin shell with the cutting die 20, compared to the compression cut force which is required by a straight-edged cutting die. The shearing action occurs along the entire lower cutting edge 54 because of the undulating shape of the serrations 56 of the cutting edge 54. The shearing cut action also creates a cleaner cut with less force than a pure compression cut.

Figure 5:
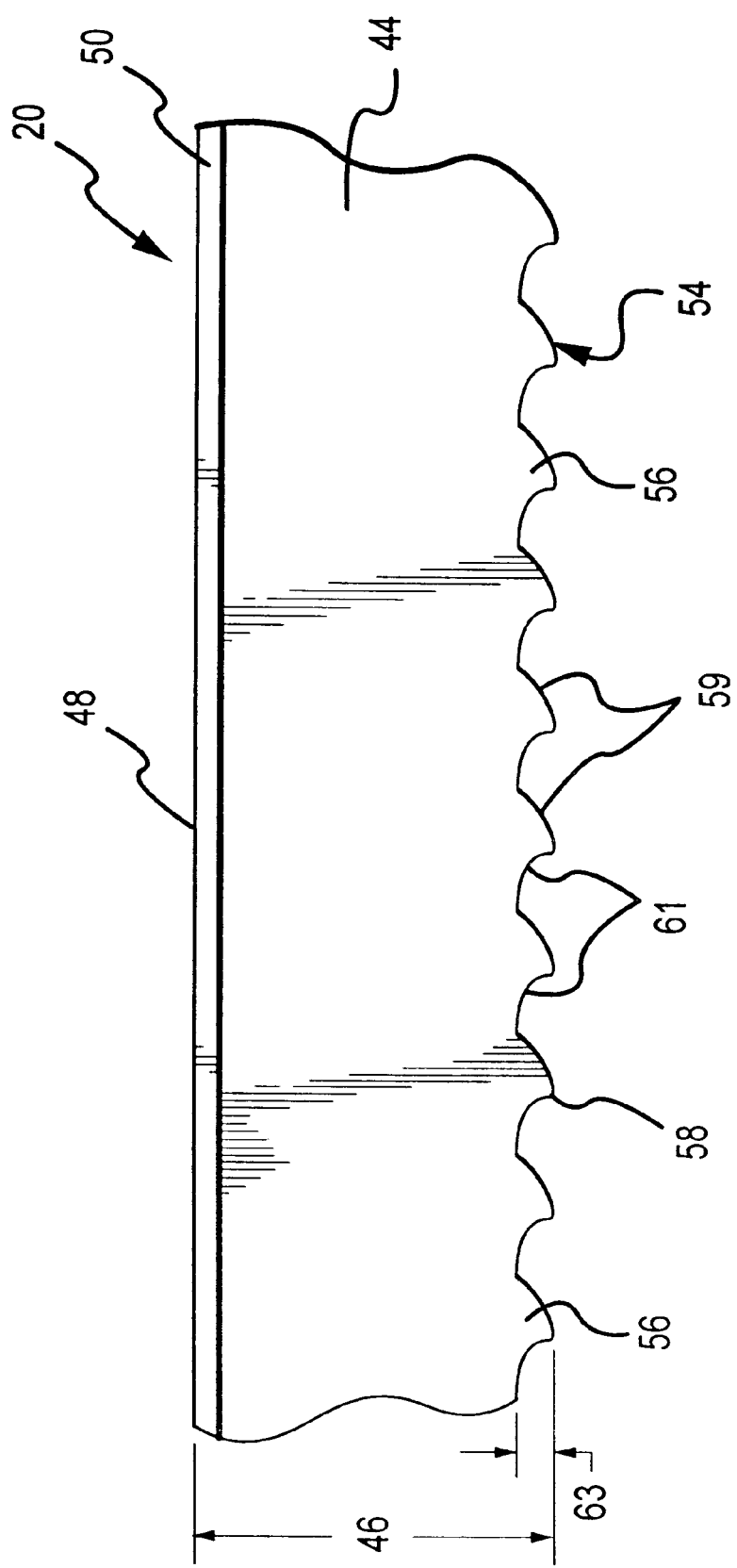
FIG. 5 is an enlarged partial side elevational view of the cutting dies shown in FIGS. 2–4 illustrating the preferred type of serrations which are formed on a cutting edge of the cutting die.

The type of serration configuration which is preferably employed in the present invention is a concave/convex configuration shown in FIG. 5. Each serration 56 has a convex portion 59 and a concave portion 61 which meet to form the tip 58. The concave/convex portions 59 and 61 and the tips 58 create multiple angles of incidence between the die 20 and the pumpkin shell 24, thus increasing the likelihood that a portion of the cutting edge 54 will come in contact with and grip the uneven surface of the pumpkin shell 24 when the die 20 is initially positioned on the shell 24. The ratio of a height 63 of the serrations 56 to the thickness of the side wall 44 of the die 20 is such that the serrations 56 resist bending or twisting when the cutting die 20 is being driven into the pumpkin shell 24. Furthermore, the convex/concave serration 56 has a relatively long cutting edge per linear distance of the periphery of the cutting edge 54, thereby providing a greater shearing cut action.

The height 46 of the side wall 44 must be sufficient to allow the cutting edge 54 of the cutting die 20 to project completely through the thickness of the shell 24 of the pumpkin, while allowing the striking edge 48 to be spaced from an outer surface of the pumpkin shell 24 (FIG. 1) when the cutting surface 54 has penetrated the pumpkin shell. With this height dimension 46, the upper edge 48 will not have to be driven flush to the outer surface of the pumpkin shell, thereby reducing the risk that a blow from the striking tool will contact the surface of the pumpkin and damage the shell or the shape 22 (FIG. 1).

Figure 6:
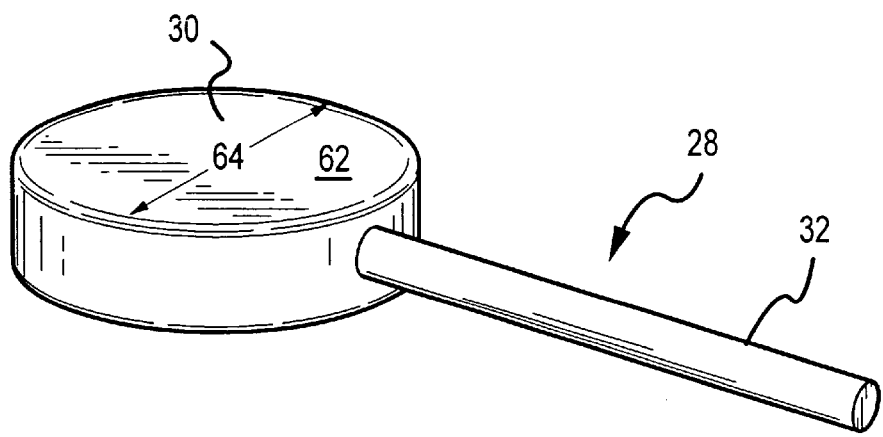
FIG. 6 is an enlarged perspective view of the striking tool shown in FIG. 1.

The head 30 of the striking tool 28, as shown in FIG. 6, is preferably constructed of material having the predominant mass of the tool 28. The mass of the head 30 is sufficient to transfer a reasonable amount of energy for forcing the cutting die 20 into the pumpkin shell 24 (FIG. 1) but not to require such energy from the user that the striking tool 28 can not be manipulated conveniently. Furthermore, the mass of the head 30 should not be so large as to cause a high risk of damage to the pumpkin shell should the head 30 inadvertently impact the pumpkin shell. Moreover, the material from which the head 30 is constructed should preferably be rigid but capable of a very slight amount of resilience, to facilitate a more even distribution of force over the entire striking edge of the die and to avoid overly concentrating the force at a singular location on the striking edge 48 which might deform the striking edge of the die. Preferably, the material from which the head 30 is formed is wood, which has been shaped as a right cylinder, as shown in FIG. 6. The handle 32 is secured to the head 30, and extends outwardly from the head 30. Preferably, the handle 32 is also made of wood.

The head 30 has a contact surface 62 which has size dimensions (a diameter 64 in the case of the right cylindrical head 30 illustrated) that are preferably sufficient to completely contact the entire striking edge 48 of each die 20, or alternatively at least the greater portion of the striking edge 48. The size of the contact surface 62 is sufficient to cover the majority of the striking edge 48. Sized in this matter, the head 30 of the striking tool 28 will deliver impact force to substantially all of the striking edge 48 of each die 20, provided that the die 20 is impacted by a directly centered blow from the striking tool 28.

The uniform distribution of force from the striking tool prevents one side of the die 20 from projecting into the pumpkin shell to a significantly greater depth than the other side, and thereby prevents the die from canting, twisting, tipping or otherwise becoming uneven in its penetration through the pumpkin shell. In the example of a right cylindrical head 30, the lateral dimension of the contact surface (diameter 64) is preferably greater than the largest transverse dimension between opposite locations of the upper striking edge 48 of the pumpkin cutting dies 20 supplied with the pumpkin carving kit.

Figure 7:
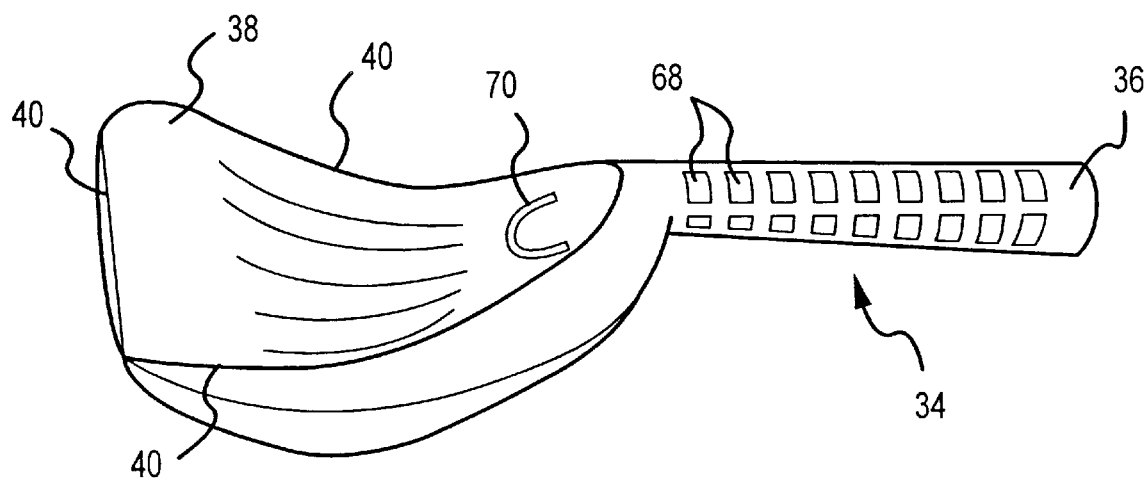
FIG. 7 is an enlarged perspective view of the scoop and scraping tool shown in FIG. 1.

The combination scoop and scraping tool 34, shown in greater detail in FIG. 7, is preferably of the type described in U.S. Pat. No. 5,092,050 to Bardeen. The handle portion 36 of the tool 34 includes ridges or corrugations 68 which allow the user to maintain a firm grip on the handle portion 36 when scraping and removing the wet, slippery inner fiber material and seeds from the pumpkin 26. The scoop portion 38 is concavely shaped to contain the fiber material and seeds which are removed. The scoop portion 38 also includes an arcuate ridge 70 aligned with the handle portion 36 into which the users thumb can be placed to maintain the tactile feel of a proper and firm grip on the handle portion 38 when the user's hands become wet and slippery with moisture from the interior of the pumpkin 26. The handle portion 36 and the ridge 70 enhance the user's ability to control and manipulate the scoop portion 38, particularly when the user is a child.

The cutting edge 40 is formed along the front and side edges of the scoop portion 38, and is particularly useful for scraping the inner wall of the pumpkin shell 24 to reduce its thickness, as well as removing the interior fiber material and lifting the seeds from the interior wall of the pumpkin shell 24. The cutting edge 40 of the scoop portion 38 is sharp enough to effectively scrape thin slices or layers of material from the interior surface of the pumpkin shell 24, but not so sharp as to cut the user. The step of scraping material from the interior surface of the pumpkin shell is described more completely in conjunction with the method of practicing the present invention, next described.

Figure 8:
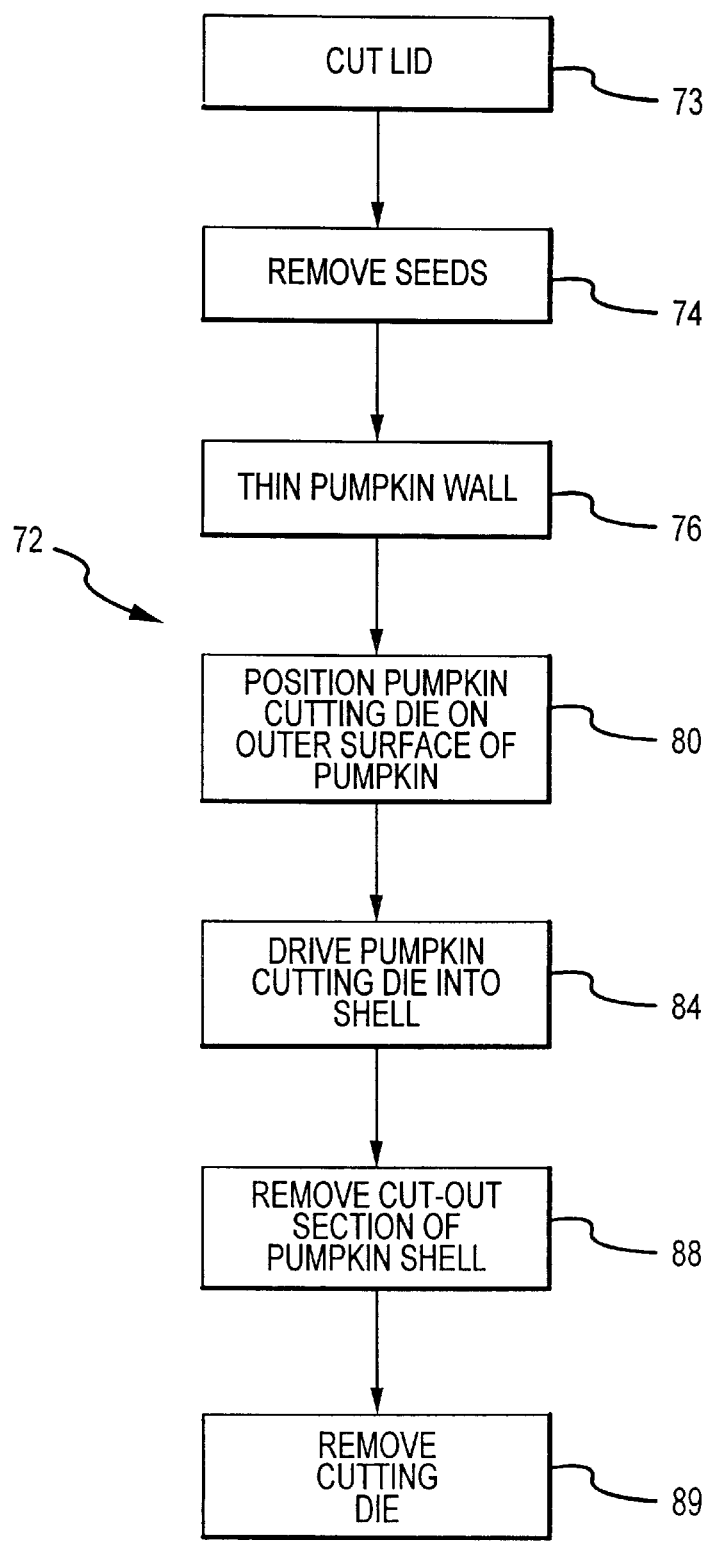
FIG. 8 is a flow chart depicting steps of a method of carving a pumpkin using the apparatus shown in FIGS. 1–7.

The fundamental steps of a pumpkin carving method according to the present invention are shown in FIG. 8 and referenced at 72. Preferably, the method steps are accomplished using a combination of the dies 20, the striking tool 28 and the scoop and scraping tool 34 forming the pumpkin carving kit described above. The pumpkin 26 is prepared for carving, as referenced at 73, by cutting the lid 42 into the pumpkin shell 24, as previously described in conjunction with FIG. 1. Alternatively, another type of access opening (not shown) may be cut in the bottom or side of the pumpkin shell. The lid 42 is then removed to gain access to the interior of the pumpkin 26 for removing the pumpkin seeds and internal fiber material, as referenced at step 74.

The scoop and scraping tool 34 (FIG. 7) is preferably used to remove the pumpkin seeds and the internal fiber material. The scoop and scraping tool 34 is first used to scrape, cut and dislodge the fiber material from the interior surfaces of the pumpkin shell. The cutting edge 40 of the tool 34 assists in separating the fiber material from the interior of the shell. Next, the accumulated material including the seeds is scooped into the scoop portion 38. The cutting edge 40 also assists in containing the seeds within the hollow interior into the scoop portion 38 of the tool 34. The scoop portion 38 of the tool 34 confines the fiber material and the seeds, allowing the user to remove this material from the hollow interior. The scoop portion 38 also allows more of this material to be removed than can be conveniently removed with a spoon or by hand.

After all of the seeds and fiber material have been removed from the interior of the shell, the next step, referenced at 76 in FIG. 8, is to thin or reduce the thickness of the wall of the pumpkin shell to a thickness dimension which is less than the height 46 of the sidewall 44 of the cutting die 20 (FIGS. 2 and 5). The thickness of the pumpkin shell 24 (FIG. 1) should be thinner than the height 46 of the sidewall 44 to allow the lower cutting edge 54 of the cutting die 20 to pass completely through the shell 24 when the striking edge 48 is still at the exterior of the pumpkin. Otherwise, the shape 22 (FIG. 1) will not completely cut out a section of the pumpkin shell 24. Reducing the thickness of the pumpkin shell is also useful in preventing the striking edge 48 (FIG. 2) from being driven into or close to the outer surface of the pumpkin shell, thereby avoiding the possibility that the impacts delivered to the die will result in marring or damaging the pumpkin shell 24.

Figure 9:
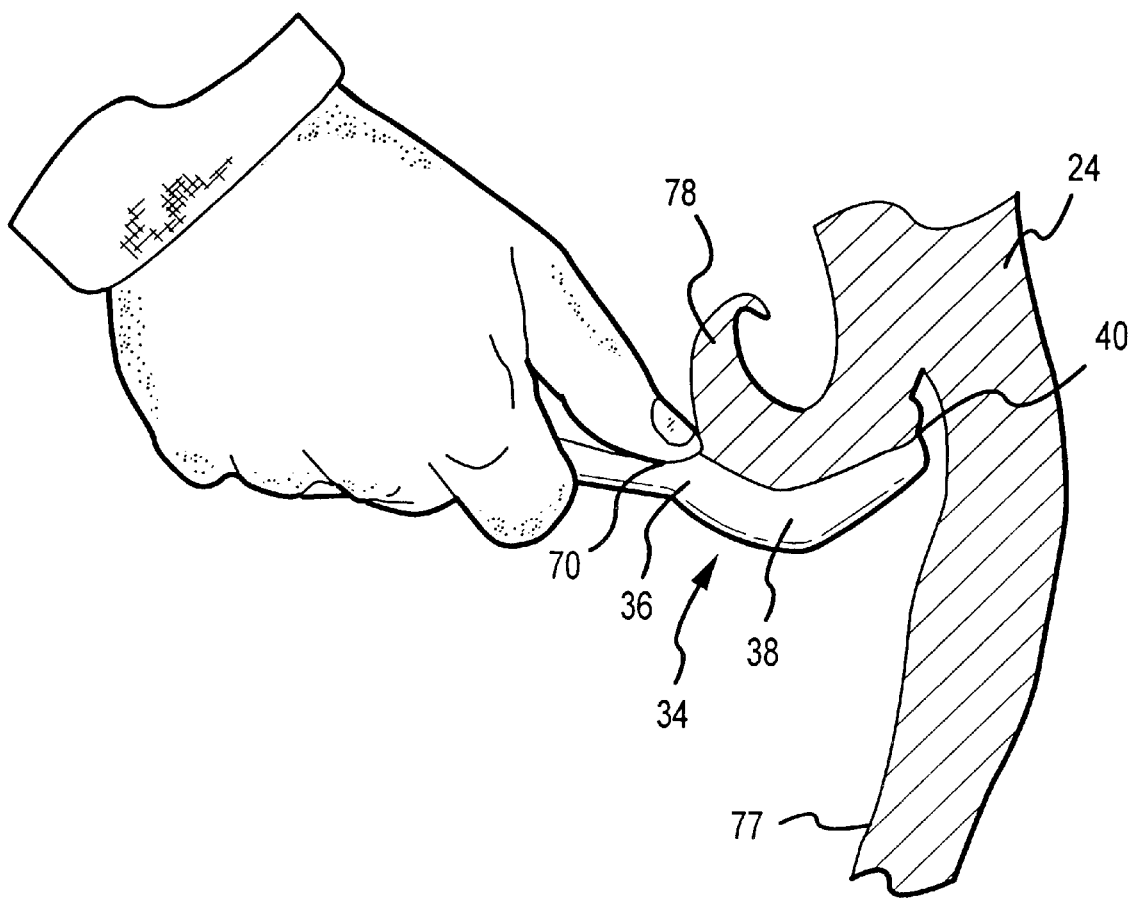
FIG. 9 is an illustration of the use of the scoop and scraping tool shown in FIG. 7 to perform the step shown in FIG. 8 of thinning or reducing the thickness of the pumpkin shell.

The step 76 of thinning the pumpkin shell 24 is also preferably accomplished by use of the scoop and scraping tool 34, as shown in FIG. 9. The user firmly grips the handle portion 36 with his or her thumb placed on the scoop portion 38 within the ridge 70 (FIG. 7), to achieve the best gripping and leverage on the tool 34. The user brings the cutting edge 40 into contact with an inner wall 77 of the pumpkin shell 24, and moves the cutting edge 40 in a parallel motion along the inner wall 77 while applying firm pressure between the tool 34 and the pumpkin shell 24. A scraping, shearing action occurs which causes an inner layer 78 of the pumpkin shell material to separate in a curled configuration. The concave curvature of the scoop portion 38 promotes curvature of the layer 78 and allows a full pass of the tool along the inner wall 76 without having the layer 78 interfere with the movement. A number of such scraping, shearing passes are made along the inner wall 76 of the pumpkin shell 24 until the pumpkin shell 24 is sufficiently reduced in thickness at all locations where the pattern or image is to be carved.

Figure 10:
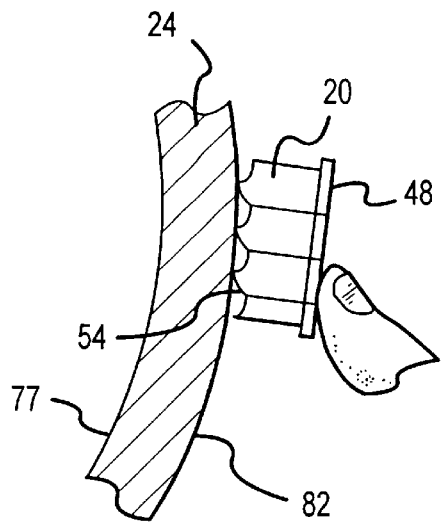
FIGS. 10, 11, 12 and 13 are partial cross sectional side views of the pumpkin shell to which the apparatus shown in FIGS. 1–7 is applied when performing steps of the method shown in FIG. 8.

Once the pumpkin shell 24 has been sufficiently thinned in the locations where the shapes 22 (FIG. 1) will be formed, the next step 80 in the method 72 (FIG. 8) involves positioning the selected cutting die 20 on an outer surface 82 of the pumpkin shell 24, as shown in FIG. 10. After determining the location where the particular shape 22 (FIG. 1) is desired, the cutting edge 54 of the die 20 is pressed into the outer surface 82 of the pumpkin shell 24. Preferably, finger pressure is sufficient to initially tack the cutting die 20 into this position, because of the shape of the serrations 56 (FIG. 5). Generally speaking, only some of the tips 58 (FIG. 5) of the cutting edge 54 need to penetrate the outer surface 82 of the pumpkin shell 24 in order to hold the die 20 in the desired position.

Figure 11:
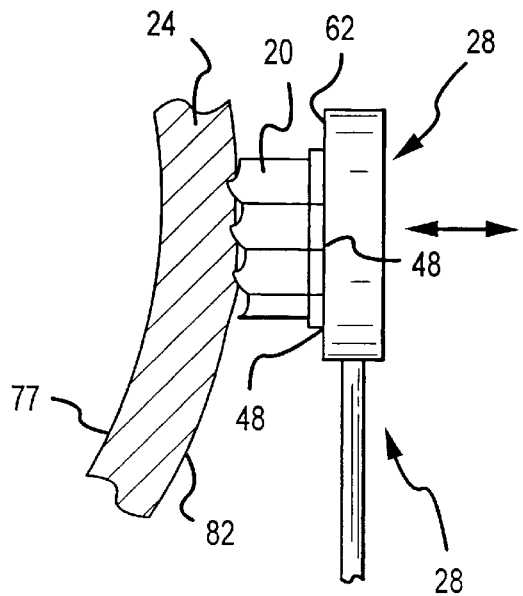
Figure 12:
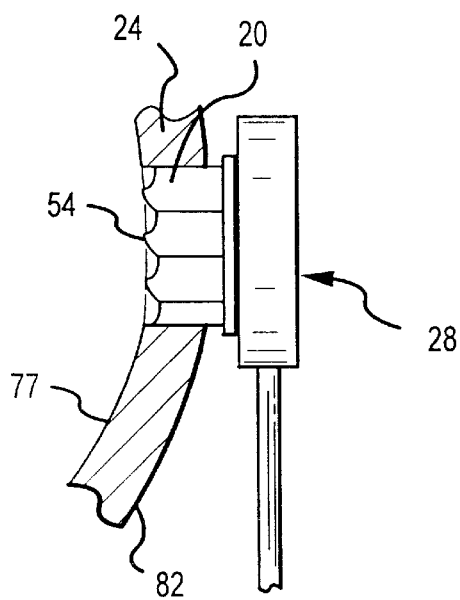

The next step 84 of the method 72 (FIG. 8) involves driving the cutting die 20 into and through the pumpkin shell 24, and these steps are illustrated by FIGS. 11 and 12. The striking tool 28 is used to tap on the upper striking edge 48 of the cutting die 20, starting from the tacked position shown in FIG. 11. A few taps with the striking tool 28 are required to firmly set the cutting die 20 in the pumpkin shell 24. Because of the size of the contact surface 62 of the striking tool 28, the cutting die 20 is initially established in a position where its progression through the pumpkin shell is direct and straight, to avoid extra forces and deformation from tilting or canting of the die 20 as it is initially started. Of course, once the die 20 is started, it remains in place so that additional impacts from the striking tool 28 can be delivered without holding it in place.

The continual impacts created by the contact of the striking tool 28 with the cutting die 20 propel the cutting die 20 evenly and directly into and through the pumpkin shell 24, as shown in FIG. 12. The striking tool 28 is wielded so that the contact surface 62 covers substantially all or a majority of the upper striking edge 48 of the cutting die 20. The upper striking edge 48 of the cutting die 20 is repeatedly struck in this way until the lower cutting edge 54 of the cutting die 20 has penetrated the inner wall 77 of the pumpkin shell 24, as shown in FIG. 12. Because the thickness of the pumpkin shell 24 has been reduced by the step 76, shown in FIGS. 8 and 9, the die 20 projects entirely through the pumpkin shell 24 to cut out a section 90 (FIG. 13) of the shell 24 circumscribed by the die 20. A moderate tapping force is generally sufficient to drive the cutting die 20 through the pumpkin shell 24 with efficiency, because of the shearing cutting action of the serrations 56 on the lower cutting edge 54 (FIG. 5).

Figure 13:
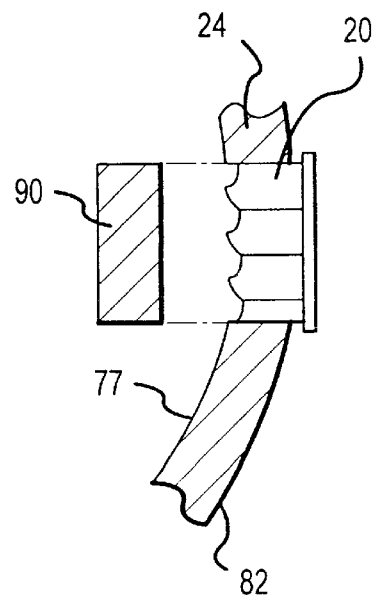

Next, after the lower cutting edge 54 of the cutting die 20 has been driven completely through the shell 24, the next step 88 of the method 72 (FIG. 8) is performed. The step 88 involves removing a cut-out section 90 from within the cutting die 20, as shown in FIG. 13. The cut-out section 90 is circumscribed by the peripheral shape of the cutting die 20. Removing the cut-out section 90 is accomplished by pushing the cut-out section 90 into the interior of the pumpkin 26, either with the handle 32 of the striking tool 28 or with a finger, while the cutting die 20 remains in place in the pumpkin shell 24. The cut-out section 90 can be pushed through the cutting die 20 in this manner because the side wall 44 of the cutting die remains generally parallel at all locations, due to the direct orientation and direction of the cutting die as it is started and moved through the pumpkin shell 24. The cut-out section 90 is then removed from the pumpkin 26 through the access opening at which the lid 42 (FIG. 1) has been cut. The cutting die 20 is then removed from the pumpkin shell 24 by pulling it from the hole which defines the shape 22 (FIG. 1). Removing the cut-out section 90 of the pumpkin shell causes a slight loosening of the die 20 in the shell to facilitate removing the die, as referenced at 89 (FIG. 8) with fingers or a gripping tool, such as a pliers.

The method steps 72 shown in FIG. 8 can be repeated as many times as necessary with as many dies 20 as needed in as many areas of the outer surface 80 of the shell 24 as are necessary or desirable to carve unique designs and patterns in the pumpkin. A candle or other light source may be placed inside the pumpkin so that the carved design may be highlighted.

The cutting die 20 and the striking tool 28 facilitate the easier and more convenient creation of shapes in pumpkins and in other similar fruits or vegetables. The serrations on the cutting edge of the dies allow them to be positioned or tacked in place with finger pressure. Once tacked in place, the die is directly driven into the shell with the striking tool which has a head of a sufficient size to preferably cover at least the majority of the lateral dimension of the striking edge of the cutting die. The scoop and scraping tool is used to reduce the thickness of the wall of the pumpkin so the cutting die can penetrate through the pumpkin and reduce the risk of accidental damage to the pumpkin shell. Many other advantages are achieved by use of the kit of the present invention.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiment set forth above.

The invention claimed is:

1. A method of carving shapes in the shell of a pumpkin or other fruit or vegetable by driving a cutting die element into the shell of the pumpkin or fruit or vegetable by striking the die element with a striking tool, and further comprises steps of:

using a cutting die element having a serrated cutting edge; and forcing a portion of the serrated cutting edge into an outer surface of the shell with finger pressure to hold the die element in position on the shell before striking the die element with the striking tool.

2. A method as defined in claim 1 further comprising the steps of:

using a die element with tips on the serrated cutting edge; and piercing the outer surface of the pumpkin shell with at least two of the tips of the serrated cutting edge to hold the die element in position prior to striking the die element with the striking tool.

3. A method as defined in claim 1 further comprising the steps of:

using a die element having an upper striking edge;

applying impact force over substantially all of the upper striking edge simultaneously with each impact from the striking tool; and applying the impact force from a striking tool having a contact surface with a lateral dimension which is greater than a largest transverse dimension between opposite sides of the upper striking edge.

4. A method as defined in claim 1 further comprising the step of;

applying impact force over substantially all of the upper striking edge with each impact from the striking tool, the contact surface of the striking tool having a lateral dimension which is greater than the majority of the largest transverse dimension between opposite sides of the striking edge.

5. A method as defined in claim 1 further comprising the step of:

scraping a layer of material from an inner surface of the shell to reduce the thickness of the shell to an amount less than a height dimension between the cutting and striking edges of the die element.

6. A method as defined in claim 5 further comprising-the step of:

using a scoop and scraping tool to scrape the layer of material from the shell.

7. A method of carving shapes in the shell of a pumpkin, fruit or vegetable which comprises driving a cutting die element through the shell by striking the die element with a striking tool, and further comprises steps of:

using a die element having a lower cutting edge and an upper striking edge;

applying impact force over substantially all of the upper striking edge simultaneously with each strike of the striking tool against the die element;

using a striking tool having an integral contact surface with a lateral dimension which is greater than a largest transverse dimension between opposite sides of the upper striking edge to apply the impact force; and striking the striking tool against the die element to create each impact by moving the contact surface of the striking tool from a position spaced from the die element into contact with the striking edge.

8. A method as defined in claim 7 further comprising the step of:

driving the die element into the pumpkin shell until the cutting edge passes through an inner surface of the pumpkin shell.

9. A method as defined in claim 7 further comprising the step of:

removing a cut-out section of the shell which is surrounded by the die element after the die element is driven into the shell;

pushing the cut-out section into the interior of the pumpkin while the die element remains in the shell; and, removing the die element from the pumpkin shell after the cut-out section has been removed from the die element.

10. A method of carving shapes in the shell of a pumpkin, fruit or vegetable which comprises driving a cutting die element through the shell by striking the die element with a striking tool, and further comprises steps of:

using a die element having a lower cutting edge and an upper striking edge;

applying impact force over substantially all of the upper striking edge simultaneously with each impact from the striking tool;

using a striking tool having a contact surface with a lateral dimension which is greater than a largest transverse dimension between opposite sides of the upper striking edge to apply the impact force; and scraping a layer of material from the shell at an inner surface of the shell to reduce the thickness of the shell to an amount less than a dimension between the cutting and striking edges of the die element.

11. A method of carving shapes in the shell of a pumpkin, fruit or vegetable which comprises driving a cutting die element through the shell by striking the die element with a striking tool, and further comprises steps of:

using a die element having a lower serrated cutting edge and an upper striking edge;

applying impact force over substantially all of the upper striking edge simultaneously with each impact from the striking tool;

using a striking tool having a contact surface with a lateral dimension which is greater than a largest transverse dimension between opposite sides of the upper striking edge to apply the impact force; and forcing a portion of the serrated cutting edge into an outer surface of the shell to hold the die element in position on the shell before striking the die element with the striking tool.

12. A method of carving shapes in the shell of a pumpkin, fruit or vegetable which comprises the steps of:

using a die element having a lower serrated cutting edge and an upper striking edge;

scraping a layer of material from the shell at an inner surface of the shell to reduce the thickness of the shell to an amount less than a dimension between the cutting and striking edges of the die element;

piercing the outer surface of the shell with the serrated cutting edge to hold the die element in position on the shell; and forcing the die element into the shell until the cutting edge passes through an inner surface of the shell.

13. A method as defined in claim 12 further comprising the step of:

using a scoop and scraping tool to scrape the layer of material from the shell; and removing a cut-out section of the shell which is surrounded by the die element after the die element is forced into the shell.

14. A method as defined in claim 7 further comprising the steps of:

using a cutting die element having a serrated cutting edge; and forcing a portion of the serrated cutting edge into an outer surface of the shell with finger pressure to hold the die element in position on the shell before striking the die element with the striking tool.

15. A method as defined in claim 14 further comprising the steps of:

using a die element with tips on the serrated cutting edge; and piercing the outer surface of the pumpkin shell with at least two of the tips of the serrated cutting edge to hold the die element in position prior to striking the die element with the striking tool.

16. A method as defined in claim 8 further comprising the step of:

scraping a layer of material from an inner surface of the shell to reduce the thickness of the shell to an amount less than a height dimension between the cutting and striking edges of the die element.

17. A method as defined in claim 10 further comprising the steps of:

using a cutting die element having a serrated cutting edge; and forcing a portion of the serrated cutting edge into an outer surface of the shell with finger pressure to hold the die element in position on the shell before striking the die element with the striking tool.

18. A method as defined in claim 10 further comprising the steps of:

using a die element with tips on the cutting edge; and piercing the outer surface of the pumpkin shell with at least two of the tips of the cutting edge to hold the die element in position prior to striking the die element with the striking tool.

19. A method as defined in claim 10 further comprising the step of:

driving the die element into the pumpkin shell until the cutting edge passes through an inner surface of the pumpkin shell.

20. A method as defined in claim 10 further comprising the step of:

removing a cut-out section of the shell which is surrounded by the die element after the die element is driven into the shell.

21. A method as defined in claim 20 further comprising the step of:

removing the die element from the pumpkin shell after the cut-out section has been removed from the die element.

22. A method as defined in claim 10 further comprising the step of:

using a scoop to scrape the layer of material from the shell.

23. A method as defined in claim 11 further comprising the steps of:

using a die element with tips on the serrated cutting edge; and piercing the outer surface of the pumpkin shell with at least two of the tips of the serrated cutting edge to hold the die element in position prior to striking the die element with the striking tool.

24. A method as defined in claim 11 further comprising the steps of:

scraping a layer of material from an inner surface of the shell to reduce the thickness of the shell to an amount less than a height dimension between the cutting and striking edges of the die element.

25. A method as defined in claim 24 further comprising the step of:

using a scoop and scraping tool to scrape the layer of material from the shell.

26. A method as defined in claim 24 further comprising the step of:

driving the die element into the pumpkin shell until the cutting edge passes through an inner surface of the pumpkin shell.

27. A method as defined in claim 26 further comprising the step of:

removing a cut-out section of the shell which is surrounded by the die element after the die element is driven into the shell.

28. A method as defined in claim 27 further comprising the step of:

removing the die element from the pumpkin shell after the cut-out section has been removed from the die element.

29. A method as defined in claim 28 further comprising the step of:

removing a cut-out section of the shell which is surrounded by the die element after the die element is driven into the shell.

30. A method as defined in claim 29 further comprising the step of:

removing the die element from the pumpkin shell after the cut-out section has been removed from the die element.

* * * * *